United States Patent
Lewin et al.

(10) Patent No.: US 10,199,749 B2
(45) Date of Patent: *Feb. 5, 2019

(54) UNDERWATER CONNECTING APPARATUS AND ASSEMBLIES

(71) Applicant: Siemens Aktiengesellschaft, Munich (DE)

(72) Inventors: Richard Lewin, Ulverston (GB); Christopher Plant, Lancaster (GB)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 162 days.

This patent is subject to a terminal disclaimer.

(21) Appl. No.: 15/080,616

(22) Filed: Mar. 25, 2016

(65) Prior Publication Data

US 2016/0211589 A1 Jul. 21, 2016

Related U.S. Application Data

(62) Division of application No. 14/890,945, filed as application No. PCT/EP2014/061263 on May 30, 2014, now Pat. No. 9,748,669.

(30) Foreign Application Priority Data

Jun. 4, 2013 (EP) .................... 13170455

(51) Int. Cl.
*H01R 4/18* (2006.01)
*H01R 4/20* (2006.01)
(Continued)

(52) U.S. Cl.
CPC ............ *H01R 4/183* (2013.01); *H01R 4/18* (2013.01); *H01R 4/20* (2013.01); *H01R 4/72* (2013.01);
(Continued)

(58) Field of Classification Search
CPC .......... H01R 4/18; H01R 13/582; H01R 4/20; H01R 13/523; H01R 13/53; H01R 13/6592; H02G 1/10; H02G 15/14
(Continued)

(56) References Cited

U.S. PATENT DOCUMENTS 4,006,288 A  2/1977 Stevens
4,079,189 A  3/1978 Troccoli
(Continued)

FOREIGN PATENT DOCUMENTS

EP   2458687 A1   5/2012
FR   2920599 A1   3/2009
(Continued)

OTHER PUBLICATIONS

European Search Report dated Jun. 6, 2016 to corresponding application EP 16159588.
(Continued)

*Primary Examiner* — Edwin A. Leon
(74) *Attorney, Agent, or Firm* — Harness, Dickey & Pierce, P.L.C.

(57) ABSTRACT

A cable termination apparatus for an underwater cable that includes a cable crimp for electrically connecting the underwater cable to a pin; a conductive crimp screen; and an insulating portion molded on the conductive crimp screen and located radially outwardly of the conductive crimp screen.

16 Claims, 3 Drawing Sheets

(51) Int. Cl.
*H01R 13/523* (2006.01)
*H01R 13/53* (2006.01)
*H01R 13/6592* (2011.01)
*H01R 13/58* (2006.01)
*H01R 4/72* (2006.01)
*H01R 43/04* (2006.01)
*H02G 15/14* (2006.01)
*H02G 1/10* (2006.01)

(52) U.S. Cl.
CPC .......... *H01R 13/523* (2013.01); *H01R 13/53* (2013.01); *H01R 13/582* (2013.01); *H01R 13/6592* (2013.01); *H01R 43/04* (2013.01); *H02G 1/10* (2013.01); *H02G 15/14* (2013.01)

(58) Field of Classification Search
USPC ...................................... 439/86, 449, 607.05
See application file for complete search history.

(56) References Cited

U.S. PATENT DOCUMENTS

| | | | |
|---|---|---|---|
| 4,377,547 A | | 3/1983 | Hervig |
| 4,959,508 A | | 9/1990 | McGrane |
| 5,645,442 A | * | 7/1997 | Cairns .................. H01R 13/523 |
| | | | 439/201 |
| 6,315,461 B1 | * | 11/2001 | Cairns .................. G02B 6/3816 |
| | | | 385/139 |
| 7,690,936 B1 | | 4/2010 | Snekkevik et al. |
| 7,959,454 B2 | * | 6/2011 | Ramasubramanian ..................... |
| | | | H01R 13/03 |
| | | | 439/201 |
| 9,748,669 B2 | * | 8/2017 | Lewin .................... H01R 4/183 |
| 2007/0037443 A1 | | 2/2007 | Wells |
| 2010/0200261 A1 | | 8/2010 | Boutot |

FOREIGN PATENT DOCUMENTS

| | | |
|---|---|---|
| WO | WO-2004086568 A1 | 10/2004 |
| WO | WO-2008113026 A1 | 9/2008 |

OTHER PUBLICATIONS

Extended European Search Report dated Jul. 26, 2016.
International Search Report PCT/ISA/210 for International Application No. PCT/EP2014/061263 dated Jul. 11, 2014.
Written Opinion of the International Searching Authority PCT/ISA/237 for International Application No. PCT/EP2014/061263 dated Jul. 11, 2014.
International Search Report dated Jul. 17, 2014.
Extended European Search Report dated Nov. 26, 2013.
U.S. Office Action for U.S. Appl. No. 14/890,945 dated Jan. 11, 2017.
U.S. Office Action for U.S. Appl. No. 15/080,615 dated Jan. 11, 2017.

* cited by examiner

UNDERWATER CONNECTING APPARATUS AND ASSEMBLIES

PRIORITY STATEMENT

This application is a divisional application of U.S. application Ser. No. 14/890,945 and claims priority to U.S. application Ser. No. 14/890,945 under 35 U.S.C. § 120/121, which is a national phase entry under 35 U.S.C. § 371 of PCT International Application No. PCT/EP2014/061263 which has an International filing date of May 30, 2014, which designated the United States of America and which claims priority to European patent application number EP13170455.3 filed Jun. 4, 2013, the entire contents of each of which are hereby incorporated herein by reference.

FIELD

An embodiment of the invention generally relates to underwater cable termination apparatus and assemblies and/or to methods of manufacture of such apparatus and assemblies.

BACKGROUND

It is known to terminate an underwater cable to a bulkhead of a subsea installation, to the back end of an underwater connector, or to a harness which provides an intermediate unit between a cable and another cable or subsea installation or connector.

In certain known cable termination assemblies which connect an underwater cable to a pin, a conductive core of the underwater cable is connected to the pin via a cable crimp. The pin is circumferentially surrounded by an insulating bushing. The underwater cable comprises the conductive core, an axially extending annular semi-conductive inner screen layer radially outwardly of the conductive core, an axially extending annular insulation portion radially outwardly of the semi-conductive inner screen layer and an axially extending annular conductive outer screen layer radially outwardly of the insulation portion.

A conductive crimp screen is provided around the cable crimp and extends from over an end portion of the bushing, over the cable crimp to over an end portion of the semi-conductive inner screen layer.

The cable is dressed such that there is an exposed length of semi-conductive inner screen layer between the end of the conductive cable crimp and an end of the annular insulation portion of the cable.

The assembly is housed within a conductive boot which has been filled with a setting insulating rubber.

SUMMARY

In a first aspect of an embodiment, the present invention is concerned with providing cable termination apparatus and assemblies for an underwater cable with an improved conductive crimp screen.

Viewed from a first aspect, an embodiment of the present invention provides cable termination apparatus for an underwater cable with a conductive core and an axially extending annular insulation portion, the apparatus comprising: a cable crimp for electrically connecting the conductive core of the underwater cable to a pin; and a conductive crimp screen wherein the crimp screen is arrangeable or arranged such that when the termination is assembled it extends axially over and is radially outwardly of the annular insulation portion of the cable.

The present invention according to the second aspect of an embodiment provides a cable termination apparatus for an underwater cable with a conductive core, an axially extending annular insulation portion radially outwardly of the core and an axially extending annular conductive screen layer radially outwardly of the insulation portion, the apparatus comprising: a stress control sleeve which is arranged to be located radially outwardly of the insulation portion and extend partially over the annular conductive screen layer, wherein the stress control sleeve comprises an insulating portion and a conductive portion, wherein when the cable termination apparatus is assembled the conductive portion of the stress control sleeve is in contact with an end portion of the screen layer.

A further embodiment provides an improved insulating portion around the conductive crimp screen.

The present invention according to an embodiment provides a cable termination apparatus for an underwater cable, the apparatus comprising: a cable crimp for electrically connecting the underwater cable to a pin; a conductive crimp screen; and an insulating portion which is located radially outwardly of the conductive crimp screen, wherein the insulating portion has been moulded on the conductive crimp screen prior to assembly of the termination.

The third aspect of an embodiment of the present invention also provides a cable termination assembly comprising apparatus of the third aspect of the invention (optionally with one or more of the described optional or preferable features); the underwater cable; and the pin, wherein the insulating portion has been molded on the conductive crimp screen prior to assembly of the termination.

The third aspect of an embodiment of the present invention also provides a method of manufacturing the apparatus of an embodiment of the third aspect of the invention (optionally with one or more of the described optional or preferable features).

The third aspect of an embodiment of the present invention provides a method of manufacturing a cable termination apparatus for an underwater cable, the method comprising: providing a cable crimp for electrically connecting the underwater cable to a pin; molding a conductive crimp screen; molding an insulating portion on the conductive crimp screen to form an overmolding; and locating the overmolding on the cable crimp.

Any of the features, including any of the preferable or optional features, of the first, second or third aspects of embodiments of the invention are applicable to any of the other aspects of embodiments of the invention. The assembly of the first aspect may include the features of the second aspect and/or the third aspect with or without the respective preferred features of the second aspect or the third aspect. The assembly of the second aspect may include the features of the first aspect and/or the third aspect with or without the respective preferred features of the first aspect or the third aspect. The assembly of the third aspect may include the features of the first aspect and/or the second aspect with or without the respective preferred features of the first aspect or the second aspect.

BRIEF DESCRIPTION OF THE DRAWINGS

Certain preferred embodiments of the present invention will now be described by way of example only with reference to the accompanying drawings, in which.

DETAILED DESCRIPTION OF EXAMPLE EMBODIMENTS

Figure 1:
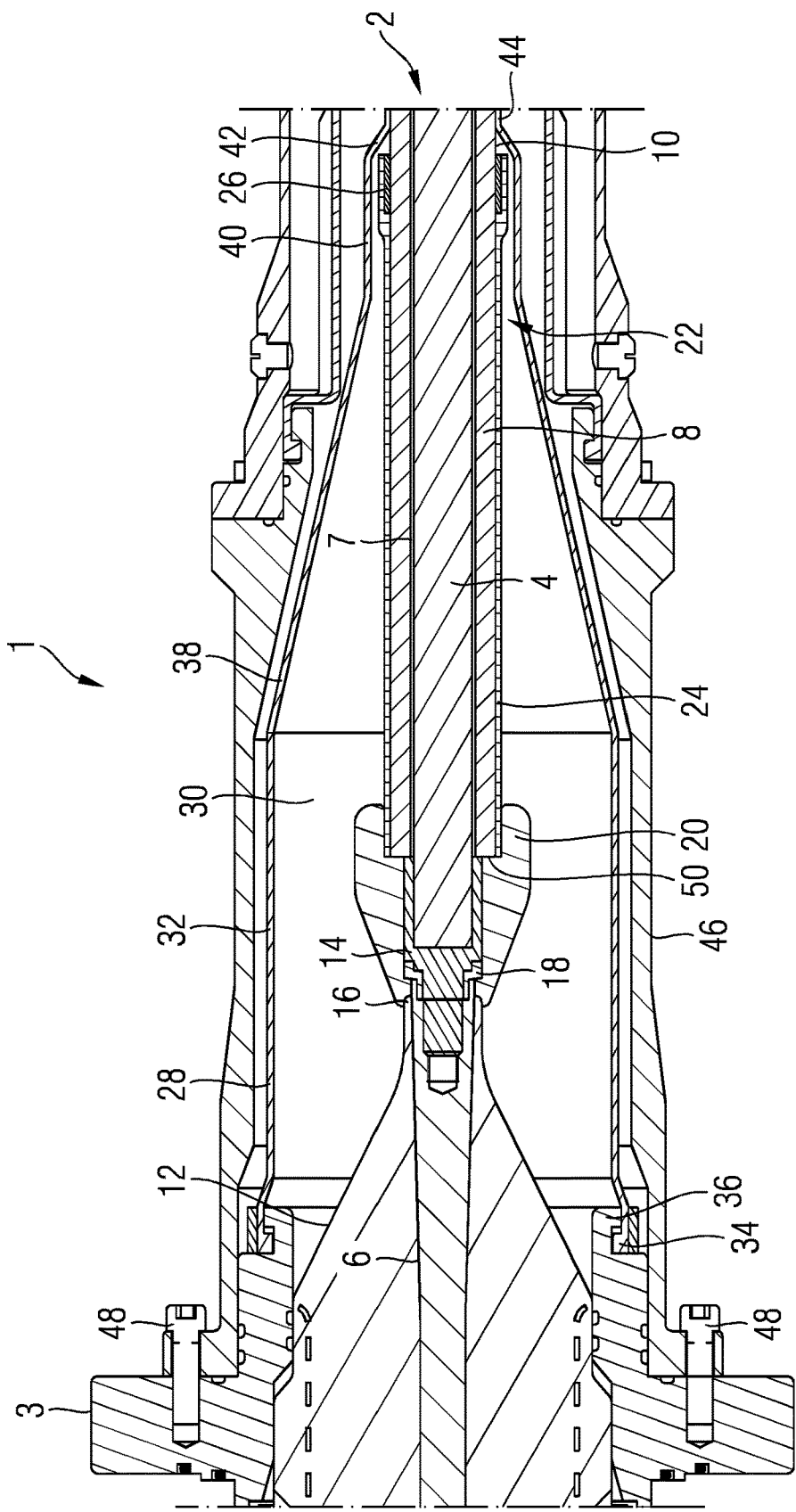
FIG. 1 shows an axial cross sectional view of an underwater connecting apparatus according to a first embodiment of the invention.

In a first aspect of an embodiment, the present invention is concerned with providing cable termination apparatus and assemblies for an underwater cable with an improved conductive crimp screen.

Viewed from a first aspect, an embodiment of the present invention provides cable termination apparatus for an underwater cable with a conductive core and an axially extending annular insulation portion, the apparatus comprising: a cable crimp for electrically connecting the conductive core of the underwater cable to a pin; and a conductive crimp screen wherein the crimp screen is arrangeable or arranged such that when the termination is assembled it extends axially over and is radially outwardly of the annular insulation portion of the cable.

A problem with the above described known cable termination assemblies is that when the assembly is subjected to a significant temperature change, differences in the thermal coefficient of expansions of the different materials used in the assembly cause relative movements between components in the assembly. For example, the assembly may be stored in a hot location, such as in Brazil or a cold location, such as in Norway, prior to deployment. In these circumstances the assembly is subjected to a significant temperature change when deployed subsea which causes the components in the assembly to contract or expand but by varying degrees owing to their different thermal coefficients of expansion. Relative movement may also be caused by certain parts having a fixed position whilst other parts can move relative to the fixed components when thermally contracting or expanding.

For example, in the above described known assembly the insulation portion will contract in a first direction (away from the termination in a backwards direction) when subjected to a significant decrease in temperature, whereas the setting rubber is bonded to the bushing on the pin and will move in a second direction, opposite to the first direction (a forwards direction), when subjected to the significant decrease in temperature. This relative movement in opposite directions can result in an air gap at the end of the insulation portion of the cable. This can drastically reduce the lifetime of the termination as the presence of an air gap at the end of the insulation portion where there may be a relatively large electric field gradient can result in arcing.

With the apparatus of the first aspect of an embodiment, the crimp screen is arrangeable or arranged such that when the termination is assembled an end portion of the crimp screen overhangs the end of the annular insulation portion of the cable. This means that if significant relative movements due to thermal contractions occur which result in an air gap at the end of the insulation portion this does not detrimentally affect the life of the termination as the air gap is enveloped by the conductive crimp screen. In other words the potential air gap is shielded from the electrical stresses and thus is not at risk of causing arcing.

Also, because the end of the insulation portion of the cable is shielded by the conductive crimp screen the end of the insulation portion may be any shape and does not need to be a shape designed to control electrical stresses. This can make manufacture of the assembly easier.

It was realized that to deal with differential thermal contractions it is preferable to design a termination that is able to tolerate internal relative movement which results in air gaps rather than trying to design a termination which prevents relative movement and/or air gaps. This is achieved by creating a design in which relative movement due to thermal contractions or expansions results in a potential air gap which is in a location not subjected to any electrical stresses, i.e. in a location which is at a constant voltage.

The conductive crimp screen is for extending axially over and radially outwardly of the cable crimp. When the termination is assembled the conductive screen may have a portion which is in contact with a radially outer surface of the cable crimp and a portion which extends axially over and radially outwardly of the annular insulation portion of the cable.

In an embodiment, the portion of the conductive crimp screen which is arrangeable or arranged to extend axially over and radially outwardly of the annular insulation portion of the cable has an inner diameter which is greater than a portion of the conductive crimp screen which is arranged to extend axially over and radially outwardly of the cable crimp.

The apparatus may be assembled at an ambient temperature and then be subjected to a decrease in temperature.

Preferably the crimp screen is arranged such that in use the portion of the screen that extends axially over and is radially outwardly of the annular insulation portion of the cable extends over the insulation portion of the cable by a sufficient distance so that when the assembly is subjected to a temperature differential of up to 45° C., or 40° C., or 30° C. or 25° C. the crimp screen still extends over the end of the insulation portion, i.e. the axial dimension of the gap at the end of the insulation portion after the termination is subjected to a significant temperature differential, such as up to 45° C., or 40° C., or 30° C. or 25° C., is less than the axial dimension of the part of the crimp screen which overhangs the insulation portion before the termination is subjected to the temperature change.

This ensures that the cable crimp screen will still envelope the end of the insulation portion even when subjected to large temperature changes such as when the cable termination apparatus is deployed to a deep subsea location.

Preferably the portion of the conductive crimp screen which is arranged to extend axially over and radially outwardly of the annular insulation portion of the cable has an inner diameter which is greater than the portion of the conductive crimp screen which is arranged to extend axially over and radially outwardly of the cable crimp. In one embodiment there is a step change in the inner diameter of the conductive crimp screen between the portion of the conductive crimp screen which is arranged to extend axially over and radially outwardly of the annular insulation portion of the cable and the portion of the conductive crimp screen which is arranged to extend axially over and radially outwardly of the cable crimp.

This means that the conductive crimp screen can extend over the annular insulation portion of the cable and conform to an outer surface thereof without creating any significant air gaps or pockets.

Preferably, the maximum inner diameter of the conductive crimp screen is slightly smaller than a maximum outer diameter of the insulation portion of the cable. This means that the conductive crimp screen is only slightly stretched to fit over the insulation portion of the underwater cable. Preferably the portion of the conductive crimp screen which is arranged to be in contact with a radially outer surface of the cable crimp when the termination is assembled has an inner diameter which is less than the outer diameter of the insulation portion of the cable. This means that the cable crimp can be arranged to conform to the outer profile of the components over which it extends when the termination is assembled and thus provides a reliable fit.

Preferably the apparatus comprises the pin to which the conductive core of the underwater cable is to be electrically connected.

Preferably the assembly is designed to allow in-line (axial) locking of the cable crimp with the pin, i.e. the termination is designed so that the cable crimp can be locked in a pin without requiring lateral (radial) access to the end of the pin. For example, the assembly may have locking means arranged so that pushing a part of the cable crimp axially into the pin locks the cable crimp in the pin. Such locking may happen automatically in response to axial relative movement of the cable crimp and the pin.

In known arrangements the cable crimp is crimped to the conductive core of a cable at one end and then the other end of the cable crimp is inserted into a socket in the end of a pin. The cable crimp is locked in the pin socket by means of radially extending screws. During manufacture of the assembly the crimp screen is moved axially along the cable so that lateral access to fix the cable crimp in the pin is provided.

With the arrangement of the first aspect of an embodiment of the present invention, because the crimp screen is arranged such that when the termination is assembled it extends axially over and is radially outwardly of the annular insulation portion of the cable, the crimp screen may not be able to be moved off the cable crimp axially along the cable during manufacture to allow lateral access to the pin. As a result in the present invention it is necessary to provide a way of locking the cable crimp in the pin without requiring lateral access.

In a preferred embodiment, such an in-line locking is achieved by providing the cable termination apparatus with a circlip which is for locking the cable crimp to the pin. For example, the pin may comprise a socket into which an end of the cable crimp is received and the circlip is located in the socket of the pin. Preferably the socket comprises a larger diameter portion and a smaller diameter portion (relative to each other) with a shoulder therebetween and preferably the circlip abuts against the shoulder in the assembled termination.

Preferably when the apparatus comprises a circlip the apparatus further comprises a retaining member, such as a retaining ring, for retaining or fixing the circlip in the socket of the pin. In a preferred embodiment the retaining member is arranged to releasably engage with the socket of the pin to lock the circlip in the socket. For example the retaining member may be provided with threads so that it can threadedly engage the socket of the pin (which may also be provided with threads). By providing a retaining member which releasably engages with the pin, the termination can be disassembled if required.

Preferably the cable crimp (the end of the cable crimp which is received in the crimp body) has cylindrical portion, a conical portion leading to a greater diameter cylindrical portion and a groove on a radially outer surface of the greater diameter cylindrical portion of the cable crimp. With this arrangement when the cable crimp is inserted into the socket of the pin the circlip is forced over the conical portion and then engages in the groove to thereby lock the cable crimp in the socket of the pin.

In a preferred embodiment, the apparatus comprises a stress control sleeve which is arrangeable or arranged to be located radially outwardly of the insulation portion. When the apparatus comprises a stress control sleeve it is preferable that the crimp screen is arrangeable or arranged such that when the termination is assembled it also extends axially over and is radially outwardly of the stress control sleeve. This means that any air gap which may form at an end of the stress control sleeve due to differential thermal contractions is also enveloped by the crimp screen such that the air gap does not affect the performance or lifetime of the termination.

In a preferred embodiment, the crimp screen is arrangeable or arranged such that when the termination is assembled the crimp screen extends axially from over an end portion of a bushing on the pin, over the cable crimp to over the annular insulation portion of the cable.

In an embodiment, the surface at which the crimp screen and the bushing of the pin are in contact is a plain, straight bore surface. In particular, the contact surface of the crimp screen is a cylindrical surface around the longitudinal axis of the crimp. This provides tolerance for a mis-positioning of the bushing relative to the crimp screen and further avoids the trapping of air pockets during assembly.

Preferably the portion of the crimp screen which extends axially over the insulation portion (or is arrangeable to axially extend over the insulation portion) has a curved end for controlling electrical stresses. This means that electrical stresses can be minimised. A radially outer surface of the crimp screen may curve towards the cable, when considered in a rearward direction, i.e. away from the termination. The crimp screen may thus have a curved rear end.

In another embodiment, the portion of the crimp screen which is arrangeable to extend axially over the insulation portion has a tapered end, which may be formed such that the contact pressure of the crimp screen (on the crimp and or on the insulation portion of the cable, when installed) reduces towards the end of the crimp screen.

In a further embodiment, the crimp screen has a first axial end for receiving the cable and a second axial end for receiving the pin, wherein the first end and the second end of the crimp screen are tapered. This allows a reduced contact pressure between the crimp screen and the pin or the cable towards the ends of the crimp screen, so that air that may be trapped between these components can escape easily towards the ends.

In an embodiment, the crimp screen is made of a resilient conductive material, in particular a conductive rubber or a semi-conductive elastomeric material. The crimp screen may for example be a molding of such material.

The underwater cable termination apparatus may be adapted for electrical signal or data transmission. It may be adapted to handle relatively low voltages, such as a peak or maximum of 1 kV or less. The underwater cable termination apparatus may be adapted for electrical power transmission.

It may be adapted to handle alternating root mean square (RMS) voltages up to 5 or 10 or 20 or 30 or 40 or 50 or 60 or or 80 or 90 or 100 or 110 or 120 or 130 or 140 kV or above.

The first aspect of an embodiment of the present invention also provides a cable termination assembly comprising the cable termination apparatus described above (optionally with one or more of the described optional or preferable features); the cable; and the pin, wherein the conductive core of the cable is connected to the pin via the cable crimp and wherein the conductive crimp screen extends axially over and is radially outwardly of the annular insulation portion of the cable.

In a second aspect, an embodiment of the present invention is concerned with providing cable termination apparatus and assemblies for an underwater cable with an improved stress control sleeve.

It is known to provide a cable termination assembly for connecting an underwater cable to a pin. The underwater cable comprises a conductive core, an axially extending annular semi-conductive inner screen layer radially outwardly of the conductive core, an axially extending annular insulation portion radially outwardly of the semi-conductive inner screen layer and an axially extending annular conductive outer screen layer radially outwardly of the insulation portion. An insulating sleeve is provided on an end portion of the insulation portion from which the conductive outer screen layer has been removed. The insulating sleeve extends over the end of the conductive outer screen layer, the end of which has been covered with conductive paint.

The assembly is housed within a conductive boot which has been filled with a setting insulating rubber.

The present invention according to the second aspect of an embodiment provides a cable termination apparatus for an underwater cable with a conductive core, an axially extending annular insulation portion radially outwardly of the core and an axially extending annular conductive screen layer radially outwardly of the insulation portion, the apparatus comprising: a stress control sleeve which is arranged to be located radially outwardly of the insulation portion and extend partially over the annular conductive screen layer, wherein the stress control sleeve comprises an insulating portion and a conductive portion, wherein when the cable termination apparatus is assembled the conductive portion of the stress control sleeve is in contact with an end portion of the screen layer.

When the apparatus is assembled the cable termination is provided at a front end of the assembly and the cable extends away from the termination in a backwards direction.

When the above described known assembly is subjected to a significant temperature change, differences in the thermal coefficient of expansions of the different materials used in the assembly cause relative movements between components in the assembly.

Specifically, in the above described known assembly the conductive outer screen layer of the cable will move in a first direction away from the cable termination (a backwards direction) when subjected to a significant decrease in temperature and the insulating sleeve is bonded to the setting rubber and will move in a second direction (a forwards direction), opposite to the first direction, when subjected to the significant decrease in temperature.

This causes relative movement between the insulating sleeve and the conductive outer screen layer which can damage the conductive paint. The conductive paint is not able to reliably accommodate relative movements and therefore it is desirable to have a termination without the conductive paint.

This can be achieved in an embodiment of the present invention by providing the stress control sleeve (preferably instead of the insulating sleeve) with a conductive portion which when the cable termination apparatus is assembled is in contact with an end portion of the screen layer.

This conductive portion is preferably designed (i.e. it has a suitable geometry) to control electrical stresses at the end of the conductive screen layer. For example the conductive portion may have a radiused end (the end of the conductive portion that is nearest the termination when the apparatus is assembled) or it may have a decreased thickness and/or diverge away from the cable as the conductive portion extends in an axial direction towards the termination. The conductive portion may be an annular part with an approximately constant outer diameter along its length and a decreasing inner diameter in a direction away from the termination. The inner surface of the conductive portion may be slanted relative to the axial direction such that its spacing from the cable insulation increases in the forward direction (towards the cable termination). This geometry can electrically shield a portion of the interface between the cable insulation and the insulating portion of the stress control sleeve. However, the conductive portion is not connected to the conductive screen layer and thus can move relative thereto without damaging any parts of the assembly.

The apparatus may be assembled at an ambient temperature and then be subjected to a decrease in temperature.

Preferably the conductive portion is of a sufficient axial dimension such that that when the assembly is subjected to a temperature differential of up to 45° C., or 40° C., or 30° C. or 25° C. which results in relative movements a part of the conductive portion is still in contact with the end of conductive outer screen layer. This means that the conductive portion will still control electrical stresses at the end of the conductive outer screen layer even when the assembly is subjected to a temperature differential of up to 45° C., or 40° C., or 30° C. or 25° C. This ensures that the conductive portion will still be in contact with the end of conductive outer screen layer even when subjected to large temperature differentials such as when the cable termination apparatus is deployed to a deep subsea location.

In a preferred embodiment, the insulating portion of the stress control sleeve has been moulded onto the conductive portion of the stress control sleeve prior to assembly of the termination. Preferably, when the stress control sleeve is manufactured, first the conductive portion is moulded and then the insulating portion is moulded onto the conductive portion, i.e. the portions of the stress control sleeve are pre-moulded and overmoulded prior to assembly of the termination. The final molding may be known as an overmolding.

This ensures that the stress control sleeve is reliably formed and that the interface between the conductive and insulating portions of the sleeve does not contain any air gaps. It can also decrease the assembly time of the termination as the parts are already provided together which makes assembly easier.

Preferably the conductive portion of the stress control sleeve forms part of the radially inner surface of the stress control sleeve. Additionally it is preferable that the insulating portion of the stress control sleeve forms the entire radially outer surface of the stress control sleeve.

This means that the conductive portion can be in contact with the end portion of the annular conductive screen layer of the cable by positioning the stress control sleeve over (radially outwardly of) the end portion of the annular conductive screen layer of the cable. Further by having the insulating portion of the stress control sleeve form the entire radially outer surface of the stress control sleeve, the insulating portion is provided radially outwardly of the conductive portion and thus shields a forward end thereof, i.e. an axial end nearest the termination. The conductive portion may be provided in the stress control sleeve but preferably has a thickness in a radial direction which is less than the thickness in a radial direction of the stress control sleeve.

In a preferred embodiment, the insulating portion of the stress control sleeve is at least partially formed from a rubber which is stretched onto the insulation portion of the cable.

It is desirable for the stress control sleeve to be formed of a rubber so that it remains energized around the insulation portion of the cable and end of the conductive outer screen even after relative movements between components in the assembled termination. For example if the sleeve is stretched in a radial direction once the assembly has been assembled, for example due to relative movements due to temperature changes, the stress control sleeve formed of rubber can revert to the energized position in which it is in direct contact with the insulation portion of the cable and the end of the conductive outer screen.

In a preferred embodiment, the insulating portion of the stress control sleeve is formed of an insulating rubber such as Powersil 415 available from Wacker Chemie AG. In a preferred embodiment the conductive portion of the stress control sleeve is formed of an electrically conductive silicone rubber such as Powersil 440 available from Wacker Chemie AG.

In a preferred embodiment, the insulating portion of the stress control sleeve is a material with high electrical permittivity. High electrical permittivity may be a material with a permittivity of, or greater than, 13, or 14, or 15.

The high permittivity material is designed to ensure that the electrical stresses in the termination remain acceptable even at high voltages.

The underwater cable termination apparatus may be adapted for electrical signal or data transmission. It may be adapted to handle relatively low voltages, such as a peak or maximum of 1 kV or less. The underwater cable termination apparatus may be adapted for electrical power transmission. It may be adapted to handle alternating root mean square (RMS) voltages up to 5 or 10 or 20 or 30 or 40 or 50 or 60 or or 80 or 90 or 100 or 110 or 120 or 130 or 140 kV or above.

The second aspect of an embodiment of the present invention also provides a cable termination assembly comprising apparatus of an embodiment of the second aspect of the invention (optionally with one or more of the described optional or preferable features); and the cable, wherein the stress control sleeve is located radially outwardly of the insulation portion of the cable and partially over the screen layer of the cable, and the conductive portion is in contact with an end portion of the annular conductive screen layer.

The features of the first and second aspects of embodiments of the invention (and one or more of their preferable or optional features) may be combined to provide an apparatus or assembly which is able to reliably accommodate temperature changes.

A further embodiment provides an improved insulating portion around the conductive crimp screen.

The present invention according to an embodiment provides a cable termination apparatus for an underwater cable, the apparatus comprising: a cable crimp for electrically connecting the underwater cable to a pin; a conductive crimp screen; and an insulating portion which is located radially outwardly of the conductive crimp screen, wherein the insulating portion has been moulded on the conductive crimp screen prior to assembly of the termination.

In certain known cable termination assemblies which connect an underwater cable to a pin, a conductive core of the underwater cable is connected to the pin via a cable crimp.

The termination is housed within a conductive boot which during assembly is filled with a setting insulating rubber which surrounds the termination and acts as an insulating portion.

This step of filling the conductive boot with a setting insulating rubber considerably increases the assembly time of the termination assembly as up to 24 hours is required for the setting insulating rubber to set from when it is poured into the conductive boot. This step of forming the insulation during assembly also reduces the reliability of the termination.

At least one embodiment of the present invention overcomes this problem by molding the insulating portion on the conductive crimp screen prior to assembly of the termination. This means that it can be ensured that a good interface without any air gaps is provided between the insulating portion and the conductive crimp screen. This also means that the assembly time of the termination can be reduced as there is no longer a need to wait for the insulating portion to set during assembly of the termination. This can reduce the amount of time needed on site to assemble the termination and thus can reduce costs.

The molding of the insulating portion on the conductive portion may be known as an overmolding. This a molding in which a first part (the conductive portion) is moulded and then a second part (the insulating portion) is moulded onto the first part.

This insulating portion is preferably arranged to accommodate the electric field created between the high voltage centrally positioned conductors and the earthed wall of the termination.

In a preferred embodiment, the insulating portion is moulded such that it surrounds the conductive portion of the conductive crimp screen. This means that it covers all the outwardly facing surfaces of the conductive crimp screen. This ensures that the insulating portion acts as an effective insulation for the conductive crimp screen when the termination is assembled.

The insulating portion may have a first end and a second end in axial direction, i.e. the longitudinal direction of the crimp, and the first and second ends may be tapered towards the respective end.

Preferably the apparatus comprises a conductive portion on a radially outer surface of the insulating portion. This conductive portion may be a conductive layer. In particular, it may be a conductive layer in form of a conductive molding.

When the termination is assembled and in use preferably this conductive portion, e.g. layer, is electrically connected to earth such as it acts as an earthed screen.

In an embodiment the conductive layer is applied to the radially outer surface of the insulating portion, for example by spraying and preferably this is performed prior to assembly of the termination. This means that a conductive layer which has a good interface with the insulating portion can be provided. Additionally, by providing the conductive layer on the insulating portion prior to assembly of the termination the assembly time can be reduced further.

In another embodiment, the conductive portion may be applied by molding.

In an embodiment, the outer conductive portion is a conductive molding. It may be provided to form the earth profile. The outer conductive portion may be made of resilient conductive material, for example of conductive rubber.

In an embodiment, the apparatus comprises a three layer component which comprises the conductive crimp screen, the overmolding of the insulating portion and the outer conductive portion, e.g. the conductive layer, in particular the conductive molding.

The three layer component may have a first end and a second end in axial direction (i.e. in the longitudinal direction of the crimp). The first end or the second end or both ends of the three layer component may be tapered towards the respective end. In such configuration, the contact pressure applied by the three layer component may get smaller towards the ends, so that any air that may be trapped during assembly can escape more easily.

In a preferred embodiment the apparatus comprises the pin.

Preferably the pin comprises an insulating bushing extending axially over and radially outwardly of the conductive core of the pin.

In a preferred embodiment, the pin comprises a conductive coating on the radial outer surface of the bushing. This conductive coating may have been applied by any known means such as plating or spraying. The conductive coating on the bushing means that the earth conductive layer on the insulating portion can be electrically connected to the conductive layer on the bushing on the pin to provide a continuous earthed layer over the assembled termination.

When the apparatus comprises a conductive layer on the radially outer surface of the insulating portion it is preferable for the apparatus to also comprise an outer conductive molding which is arranged to extend axially over and radially outwardly of the conductive layer on the insulating portion and the conductive coating on the bushing. This conductive molding may be used to electrically connect the conductive layer on the insulating portion and the conductive coating on the bushing when the termination is assembled. This outer conductive molding may have a "trumpet" shape (or an annular substantially conical shape).

In a preferred embodiment, the outer conductive molding has been molded on to the conductive layer on the insulating portion prior to assembly of the termination. This again reduces the termination assembly time as multiple parts are provided as a single overmolded component.

The underwater cable termination apparatus may be adapted for electrical signal or data transmission. It may be adapted to handle relatively low voltages, such as a peak or maximum of 1 kV or less. The underwater cable termination apparatus may be adapted for electrical power transmission. It may be adapted to handle alternating root mean square (RMS) voltages up to 5 or 10 or 20 or 30 or 40 or 50 or 60 or or 80 or 90 or 100 or 110 or 120 or 130 or 140 kV or above.

The underwater cable termination apparatus may be adapted for optical transmission, for example via optical fibres. The cable may contain optical fibres and/or electrical conductors.

The third aspect of an embodiment of the present invention also provides a cable termination assembly comprising apparatus of the third aspect of the invention (optionally with one or more of the described optional or preferable features); the underwater cable; and the pin, wherein the insulating portion has been molded on the conductive crimp screen prior to assembly of the termination.

The third aspect of an embodiment of the present invention also provides a method of manufacturing the apparatus of an embodiment of the third aspect of the invention (optionally with one or more of the described optional or preferable features).

The third aspect of an embodiment of the present invention provides a method of manufacturing a cable termination apparatus for an underwater cable, the method comprising: providing a cable crimp for electrically connecting the underwater cable to a pin; molding a conductive crimp screen; molding an insulating portion on the conductive crimp screen to form an overmolding; and locating the overmolding on the cable crimp.

This method of manufacturing a cable termination apparatus reduces the assembly time of the termination. This is because the insulating portion is molded prior to assembly of the termination which means that there is no need to wait for the insulation portion to set during assembly. Additionally, it improves the reliability of the termination as prior to assembly it can be ensured that there are no air gaps or pockets in the insulation portion.

Preferably, the method comprises providing a conductive layer on a radially outer surface of the insulating portion of the overmolding. In a preferred embodiment the step of providing a conductive layer comprises spraying the conductive layer on to the radially outer surface of the insulating portion of the overmolding.

Preferably the method comprises molding an outer conductive molding on the conductive layer on the insulating portion of the overmolding.

Any of the features, including any of the preferable or optional features, of the first, second or third aspects of embodiments of the invention are applicable to any of the other aspects of embodiments of the invention. The assembly of the first aspect may include the features of the second aspect and/or the third aspect with or without the respective preferred features of the second aspect or the third aspect. The assembly of the second aspect may include the features of the first aspect and/or the third aspect with or without the respective preferred features of the first aspect or the third aspect. The assembly of the third aspect may include the features of the first aspect and/or the second aspect with or without the respective preferred features of the first aspect or the second aspect.

Referring to FIG. 1, this shows an underwater connecting apparatus 1 for connecting a cable 2 to a bulkhead plate 3 for connection to the bulkhead of a subsea installation (not shown). The underwater connecting apparatus 1 is thus a cable termination apparatus for an underwater cable service to connect the conductive core 4 of the cable 2 to a pin 6 which passes across the bulkhead plate and into the subsea installation. It is intended to be used at high voltages, for example with an alternating voltage up to 104 kV peak phase to phase (72 kV RMS) or 51 kV peak phase to ground (36 kV RMS).

The cable 2 comprises the conductive core 4 which is made of copper, an axially extending inner semi-conductive screen layer 7 radially outwardly of the conductive core 4, an axially extending annular insulation portion 8 made of cross-linked polyethylene (XLPE) radially outwardly of the inner semi-conductive screen layer 7 and an axially extending annular conductive outer screen layer 10 radially outwardly of the insulation portion 8.

The cable 2 enters the apparatus 1 at the right hand end as seen in FIG. 1 extending in a forward direction into the apparatus. To the right of the drawings an external armour (not shown) of the cable 2 is gripped in a known manner by a strain relief (not shown).

The pin 6 is housed within an insulating bushing 12 and is electrically connected to the conductive core 4 of the cable 2 via a conductive cable crimp 14. The cable crimp 14 comprises a socket at one end for receiving the conductive core 4 of the cable 2 and a protrusion at the opposite end which is received in a socket in the pin 6. The conductive core 4 of the cable 2 is received in the socket in the cable crimp 14 and crimped therein.

Within the socket in the pin 6 is a circlip 16. The circlip 16 is located next to a shoulder in the socket of the pin 6 and is held in place by a retaining ring 18. The retaining ring 18 is threadedly engaged with the socket of the pin 6.

The end of the cable crimp 14 which is received in the socket in the pin 6 has a cylindrical portion and a conical portion leading to a greater diameter cylindrical portion (the conical portion increasing in diameter in a direction towards the cable 102). A groove is provided on a radially outer surface of the greater diameter cylindrical portion. When the end of the cable crimp 14 is inserted into the socket in the pin 6 the circlip 16 rides up over the conical portion of the cable crimp 14 and along greater diameter cylindrical portion until it reaches the groove. Once the circlip is received in the groove on the cable crimp 14 it locks the cable crimp in the socket of the pin 6.

Radially around the cable crimp 14 is a conductive crimp screen 20. The conductive crimp screen 20 extends from over the bushing 12 on the pin 6, over the retaining ring 18, over the cable crimp 14 to over an end of the cable 2 such that it extends radially outwardly of the insulation portion 8 of the cable 2.

Starting from the front end (at the left of FIG. 1), the conductive crimp screen 20 has a conical portion increasing in diameter towards the rear of the apparatus and a cylindrical portion. The portion of the conductive crimp screen 20 which extends over the conductive crimp screen 14 has a first inner diameter and the portion of the conductive crimp screen which extends axially over and radially outwardly of the insulation portion 8 of the cable 2 has a second inner diameter which is larger than the first inner diameter.

The cable 2 is dressed such that the conductive outer screen layer 10 does not extend along the whole length of the insulation portion 8. Over the exposed portion of the insulation portion 8 a stress control sleeve 22 is provided.

The stress control sleeve 22 comprises an insulating portion 24 and a conductive portion 26. The conductive portion 26 is provided at the rear end of the stress control sleeve 22 and forms part of the radially inwardly facing surface of the stress control sleeve 22. The insulating portion 24 forms the entire radially outwardly facing surface of the stress control sleeve 22 and thus extends over the conductive portion 26.

The stress control sleeve 22 is located on the cable such that the conductive portion 26 is in contact with an end of the conductive outer screen layer 10. In other words part of the conductive portion 26 is in contact with the conductive outer screen layer 10 and part of the conductive portion 26 is in contact with the insulation portion 8 of the cable. The insulating portion 24 of the stress control sleeve 22 extends along the rest of the length of the exposed insulation portion 8 of the cable 2. The conductive crimp screen 20 thus also extends over and radially outwardly of a front end portion of the stress control sleeve 24.

The termination is housed within a conductive flexible boot 28 which may be formed of a conductive silicone elastomer. The flexible boot 28 is filled with a silicone elastomer fill material 30 which encapsulates the termination.

The flexible boot 28 has a large diameter cylindrical portion 32 at its front end around the termination and is formed with an annular lip 34 held by a seal holder 36 which is part of the bulkhead plate 3.

The flexible boot 28 has a conical portion 38 decreasing in diameter from the large diameter cylindrical portion 32 in the rearward direction, away from the cable termination. It joins a smaller diameter cylindrical portion 40, which is joined by another conical portion 42, decreasing in diameter in the rearward direction, to a cable engaging cylindrical portion 44. The cable engaging cylindrical portion 44 engages the conductive cable screen layer 10 of the cable 2. In an unstressed condition it has an internal diameter slightly smaller than the outer diameter of the screen layer 10, in order to seal against and make a good electrical connection therewith.

It will therefore be seen that the semi-conductive flexible boot 28 makes electrical contact with the cable screen layer 10 at its end remote from the cable termination and further makes electrical contact with the seal holder 36, which is part of the bulkhead plate 3 which is part of the subsea installation. In use, the bulkhead plate 3, the seal holder 36, the flexible boot 28 and the cable screen 10 will be earthed. The conductive core 4 of the cable 2 and the pin 6, to which the cable conductor electrically connects, will be operated at a high electric potential, for example up to 104 kV peak phase to phase (72 kV RMS) or 51 kV peak phase to ground (36 kV RMS), thereby creating an electric field around these components. The fill material 30 in the flexible boot 28 accommodates the electric field created between the high voltage centrally positioned conductors and the earthed wall provided by the flexible boot 28. Because the flexible boot 28 is conductive it can shield the region radially outwardly thereof from electric stress. Because it is flexible it is able to deform to accommodate changes in volume caused by temperature and pressure variations.

The flexible boot 28 is housed within a housing which is bolted to the bulkhead plate 3 by fixing means 48.

To assemble the apparatus the cable 2 is dressed and the flexible boot 28 and stress control sleeve 24 are located on the cable. The stress control sleeve is located such that the conducting portion 26 is in contact with the end of the conductive screen layer 10 of the cable. The cable crimp 14 is then crimped onto the exposed conductive core 4 of the cable 2.

The pin 6 in the bushing 12 is provided and the circlip 16 is inserted into the socket and locked in place by screwing the retaining ring 18 into the socket. The cable crimp 14 which is attached to the end of the cable 2 is inserted through the conductive crimp screen 20 through the retaining ring 18 and circlip 16 until the circlip engages with the groove on the cable crimp 18 to thereby lock the end of the cable crimp 14 into the socket of the pin 6.

The action of inserting the cable crimp 14 into the socket in the pin 6 locates an end portion of the crimp screen 20 axially over and radially outwardly of the insulating portion 8 of the cable 2 and the stress control sleeve 24.

The flexible boot 28 is connected to the bulkhead plate 3 in the seal holder 36. The flexible boot 28 is then filled with liquid silicone elastomer which solidifies to form the fill material 30. This provides a solid insulating body around the termination.

The housing 46 is then provided around the assembled termination assembly.

When subjected to large temperature differentials the components of the apparatus 1 undergo thermal contractions and expansions.

The insulation portion 8 of the cable 2 will move towards the back (right hand side) of the assembly and the conductive crimp screen 20 and silicone elastomer fill material 30 are effectively fixed to the bushing 12 and will move towards the front (left hand side) of the assembly when there are significant thermal contractions. This relative movement will result in an air gap opening up in a region 50 at the end of the insulation portion 8 of the cable between the insulation portion 8 and the conductive cable crimp 20. This air gap however does not detrimentally affect the lifetime of the apparatus 1 as it is radially inwardly of the overhang portion of the crimp screen 20. This means that the air gap is not subjected to any electrical stress and thus its presence does not lead to arcing, even when the apparatus 1 is operating at high voltages. The air gap is cloaked by the rear end portion of the crimp screen.

Additionally the stress control sleeve 24 will be bonded to the silicone elastomer fill material 30 and move to the towards the front (left hand side) of the assembly when there are significant thermal contractions while the conductive screen 10 on the cable will move with the cable insulation towards the back (right hand side) of the assembly. As a result there will be relative movement between the stress control sleeve 24 and the conductive screen layer 10. The conducting portion 26 is designed such that even when the apparatus is subjected to temperature changes of up to 45° C. the conducting portion will still be in contact with the end of the outer conductive screen layer 10. This means that the apparatus will still operate reliably over its full lifetime even if subjected to significant temperature changes.

Figure 2:
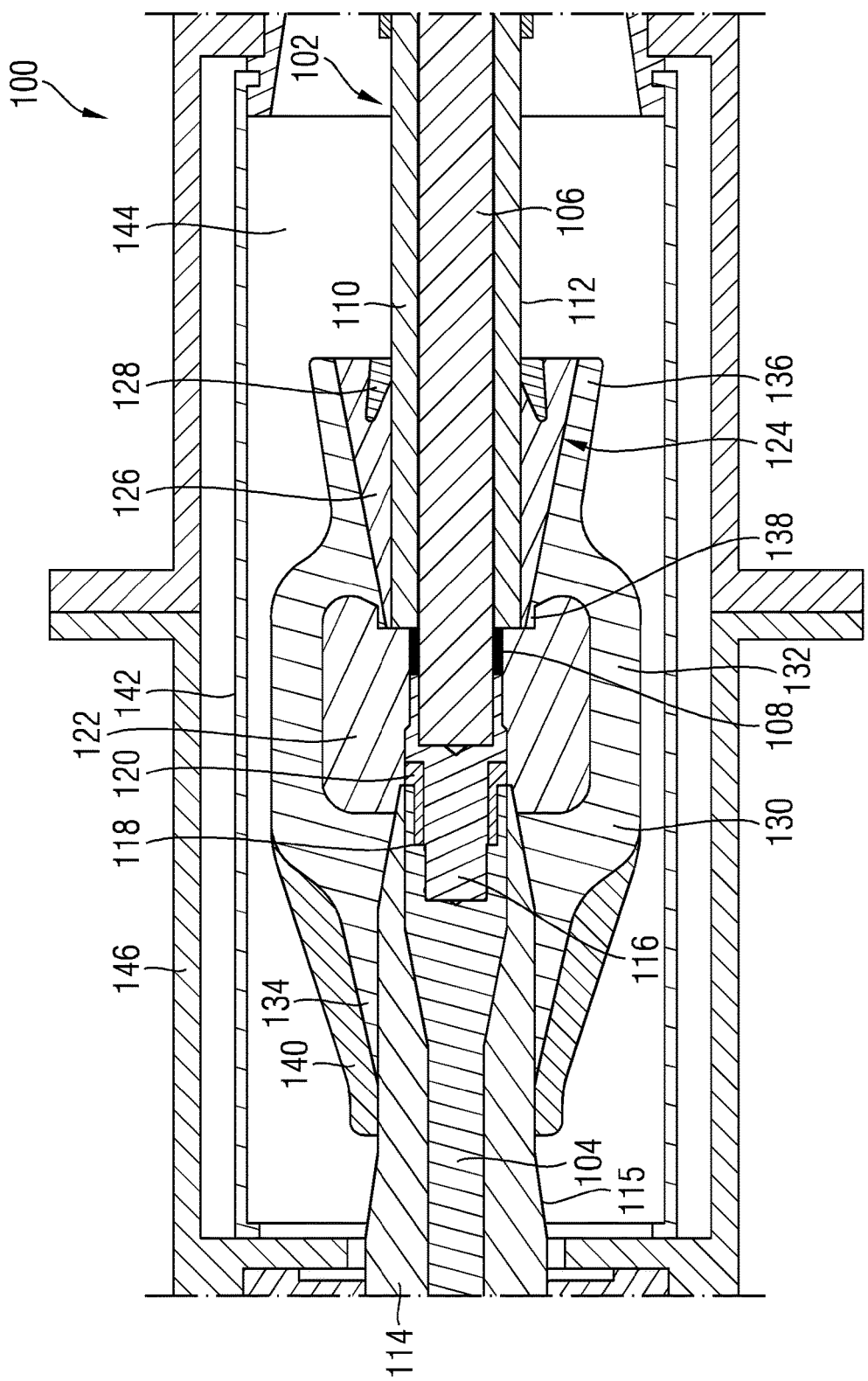
FIG. 2 shows an axial cross sectional view of an underwater connecting apparatus according to a second embodiment of the invention.

FIG. 2 shows an underwater connecting apparatus 100 for connecting a cable 102 to a pin 104.

The apparatus 100 is intended to be used at high voltages, for example with an alternating voltage up to 36.8 kV peak phase to ground (26 kV RMS).

The cable 102 comprises the conductive core 106 which is made of copper, an axially extending inner semi-conductive screen layer 108 (shown as a black line) radially outwardly of the conductive core 106, an axially extending annular insulation portion 110 made of cross-linked polyethylene (XLPE) radially outwardly of the inner semi-conductive screen layer 108 and an axially extending annular conductive outer screen layer 112 (shown as another black line) radially outwardly of the insulation portion 8.

The cable 102 enters the apparatus 100 at the right hand end as seen in FIG. 2 extending in a forward direction into the apparatus.

The pin 104 is housed within an insulating bushing 114 and is electrically connected to the conductive core 106 of the cable 102 via a conductive cable crimp 116. The bushing 114 is plated on its radially outer surface with a conductive layer 115. The cable crimp 116 comprises a socket at one end for receiving the conductive core 106 of the cable 102 and a protrusion at the opposite end which is received in a socket in the pin 106. The conductive core 106 of the cable 102 is received in the socket in the cable crimp 116 and crimped therein.

Within the socket in the pin 104 is a circlip 118. The circlip 118 is located next to a shoulder in the socket of the pin 104 and is held in place by a retaining ring 120. The retaining ring 120 is threadedly engaged with the socket of the pin 104.

The end of the cable crimp 116 which is received in the socket in the pin 104 has a cylindrical portion and a conical portion leading to a greater diameter cylindrical portion (the conical portion increasing in diameter in a direction towards the cable 102). A groove is provided on a radially outer surface of the greater diameter cylindrical portion. When the end of the cable crimp 116 is inserted into the socket in the pin 104 the circlip 118 rides up over the conical portion and along the radially outer surface of the greater diameter cylindrical portion of the cable crimp 116 until it reaches the groove. Once the circlip is received in the groove on the cable crimp 116 it locks the cable crimp in the socket of the pin 104.

Radially around the cable crimp 116 is a conductive crimp screen 122. The conductive crimp screen 122 extends from over the plated bushing 114 on the pin 104, over the retaining ring 120, over the cable crimp 116 to over an end of the cable 102 such that it extends radially outwardly of the insulation portion 110 of the cable 102. The conductive crimp screen 122 has a substantially constant outer diameter. The portion of the conductive crimp screen 122 which extends over the cable crimp 116 has a first inner diameter which is less than the inner diameter of the portion of the conductive crimp screen 122 which extends over the insulating portion 110 of the cable 102. The end of the portion of the conductive crimp screen 122 which extends over the insulating portion 110 of the cable 102 is designed to control electrical stresses. In this embodiment the end is radiused.

The cable 102 is dressed such that the conductive outer screen layer 112 does not extend along the whole length of the insulation portion 110.

Over the exposed portion of the insulation portion 110 a stress control sleeve 124 is provided.

The stress control sleeve 124 comprises an insulating portion 126 and a conductive portion 128. The insulating portion 126 is formed of a high permittivity material. This is to ensure that the electrical stresses in the termination remain acceptable even when the cable is operating at high voltages. The conductive portion 128 is provided at the rear end of the stress control sleeve 124 and forms part of the radially inwardly facing surface of the stress control sleeve 126. The insulating portion 126 forms the entire radially outwardly facing surface of the stress control sleeve 124 and thus extends over the conductive portion 128. The stress control sleeve 124 is a conical annular member with a constant inner diameter and increasing outer diameter as the stress control sleeve 124 extends towards the rear of the apparatus 100. In other words the thickness of the stress control sleeve 124 in a radial direction increases along the length of the stress control sleeve 124.

The conductive portion 128 is an annular member which is located in an end portion (the end with the greatest thickness) of the insulating portion 126. The conductive portion 128 has a constant outer diameter and a decreasing inner diameter as it extends towards the rear of the apparatus 100. The inner surface of the conductive portion 128 of the stress control sleeve is slanted relative to the axial direction of the termination such that its spacing from the insulation portion 110 of the cable 102 increases in the forward direction.

The stress control sleeve 124 is an overmolding i.e. the conductive portion 128 is moulded and then the insulating portion 126 is moulded on to the moulded conductive portion 128.

The stress control sleeve 124 is located on the cable such that the conductive portion 128 is in contact with an end of the conductive outer screen layer 112. The inner surface of the conductive portion 128 diverges away from the cable 102 in a direction towards the front of the apparatus. The end of the conductive portion 128 furthest from the conductive outer screen layer 112 has a geometry designed to control electrical stresses. In this case the end of the conductive portion is radiused. Part of the conductive portion 128 is in contact with the conductive outer screen layer 112 and part of the conductive portion 128 is in contact with the insulation portion 110 of the cable. The insulating portion 126 of the stress control sleeve 124 extends along the rest of the length of the exposed insulation portion 110 of the cable 102. The conductive crimp screen 122 thus also extends over and radially outwardly of a front end portion of the stress control sleeve 126.

The conductive crimp screen 122 is surrounded by an insulating molding 130. The conductive crimp screen 122 and the insulating molding 130 together form an overmolding, i.e. the conductive crimp screen 122 is molded and then the insulating molding 130 is moulded onto the conductive crimp screen before the termination is assembled.

The insulating molding 130 has a middle portion 132 which is in contact with the conductive crimp screen 122 and a frontwardly and rearwardly extending portion 134, 136 at each end of the middle portion. The frontwardly extending portion 134 extends over the plated bushing 114 and tapers to a point at the end of the frontwardly extending portion 134. The rearwardly extending portion 136 extends over the stress control sleeve 124. The insulating molding 130 also comprises a re-entrant portion 138 which extends radially inwardly of the portion of the conductive crimp screen 122 which extends over and radially outwardly of the front end portion of the stress control sleeve 124 and the insulating portion 110 of the cable 102.

The insulating molding 130 is spray coated on its radially outer surface with a conductive material.

An outer conductive molding 140 is provided on the coated frontwardly extending portion 134 and extends over the plated bushing 114.

In use, the plating 115 on the bushing 114, the conductive coating on the insulating molding 130, the conductive molding 140, the conductive portion 128 of the stress control sleeve 124, and the cable screen 112 will be earthed. The conductive portion 112 directs the earth field lines from the earthed cable screen 112 to the conductive coating on the insulating molding 130. This effectively electrically shields the interface between the insulation 110 on the cable and the insulating portion 126 of the stress control sleeve.

The outer conductive molding 140 is used to electrically connect the plating 115 on the pin with the spray coating on the insulating molding 130. The conductive core 106 of the cable 102 and the pin 104, to which the cable conductor electrically connects, will be operated at a high electric potential, for example up to 36.8 kV peak phase to ground (26 kV RMS), thereby creating an electric field around these components. The insulating molding 130 accommodates the electric field created between the high voltage centrally positioned conductors and the earthed wall provided by the conductive coating. The conductive coating on the insulating molding 130 shields the region radially outwardly thereof from electric stress.

The apparatus is provided with a flexible membrane 142 which is filled with a fluid 144, such as a soft, hydrophobic gel (such as Bluesil RT Gel 8208) or oil, which together form a pressure compensating means which is able to deform to accommodate changes in volume caused by temperature and pressure variations. The soft hydrophobic gel is preferable to oil as the gel would resist water more effectively in the event that the diaphragm is breached.

The arrangement is housed within a housing 146

Figure 3:
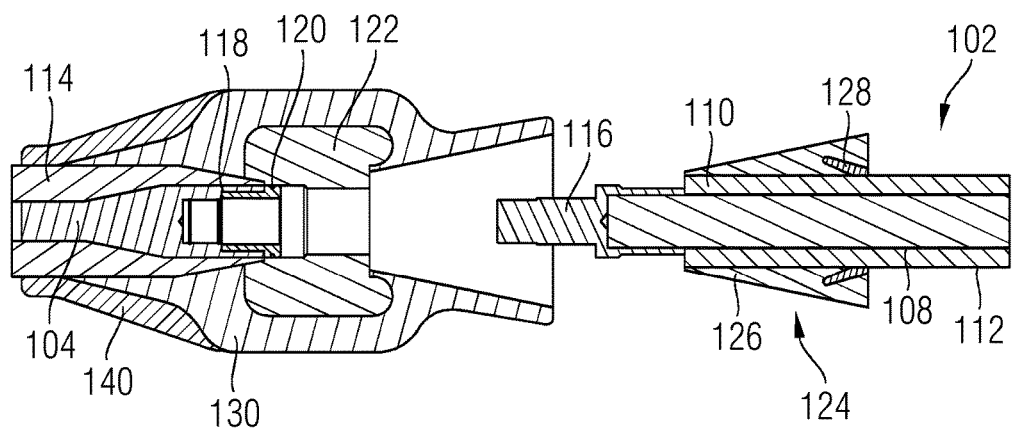
FIG. 3 shows an axial cross sectional view of part of the underwater connecting apparatus according to the second embodiment of the invention in an unmated condition.

To assemble the apparatus 100 the cable 102 is dressed and the stress control sleeve 124 is located on the cable 102. The stress control sleeve is located such that the conducting portion 128 is in contact with the end of the conductive screen layer 112 of the cable. The cable crimp 116 is then crimped onto the exposed conductive core 106 of the cable 102 (this assembly is shown on the right hand side of FIG. 3).

Figure 4:
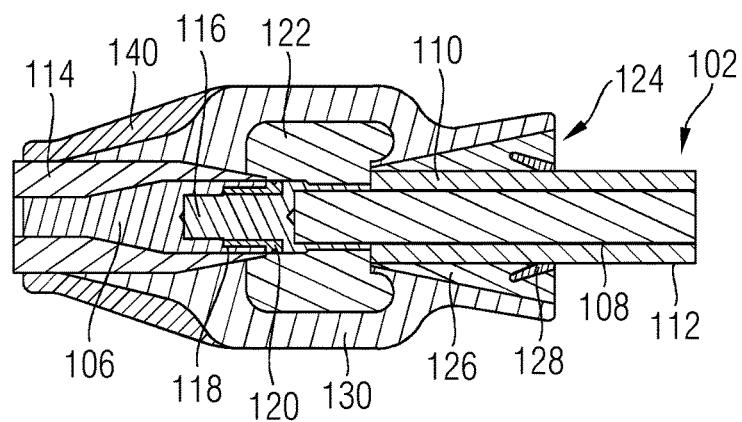
FIG. 4 shows an axial cross sectional view of part of the underwater connecting apparatus according to the second embodiment of the invention in a mated condition.

The pin 104 in the plated bushing 114 is provided and the circlip 118 is inserted into the socket and locked in place by screwing the retaining ring 120 into the socket. The overmolding, consisting of the conductive crimp screen 122, the coated insulating molding 130, and the outer conductive molding 140, is provided on an end portion of the plated bushing 114 (this assembly is shown on the left-hand side of FIG. 3). The cable crimp 116 which is attached to the end of the cable 102 is inserted through the overmolding through the retaining ring 120 and circlip 118 until the circlip engages with the groove on the cable crimp 120 to thereby lock the end of the cable crimp 116 into the socket of the pin 104 (this creates the mated condition shown in FIG. 4).

The action of inserting the cable crimp 116 into the socket in the pin 104 locates an end portion of the crimp screen 122 over and radially outwardly of the insulating portion 110 of the cable 102 and the stress control sleeve 126.

The assembled termination is located within the flexible diaphragm 142 within the housing 146. The flexible diaphragm 142 is then filled with the pressure compensating fluid 144.

While specific embodiments of the invention are disclosed herein, various changes and modifications can be made without departing from the scope of the invention. The present embodiments are to be considered in all respect as illustrative and non-restrictive, and all changes coming within the meaning and equivalency range of the appended claims are intended to be embraced therein.

The following clauses set out features of the invention which may not presently be claimed in this application, but which may form the basis for future amendment or a divisional application:

A aspect relates to a cable termination apparatus for an underwater cable with a conductive core, an axially extending annular insulation portion radially outwardly of the core and an axially extending annular conductive screen layer radially outwardly of the insulation portion, the apparatus comprising a stress control sleeve which is arranged to be located radially outwardly of the insulation portion and extend partially over the conductive screen layer, wherein the stress control sleeve comprises an insulating portion and a conductive portion, wherein when the cable termination apparatus is assembled the conductive portion of the stress control sleeve is in contact with an end portion of the annular conductive screen layer of the cable.

In an embodiment, the insulating portion of the stress control sleeve may have been overmolded onto the conductive portion of the stress control sleeve.

The conductive portion of the stress control sleeve may form part of the radially inner surface of the stress control sleeve.

The conductive portion of the stress control sleeve may be annular and the inner surface thereof may be slanted relative to the axial direction such that its spacing from the annular insulation portion of the cable increases in a direction towards the cable termination.

The insulating portion of the stress control sleeve may form the entire radially outer surface of the stress control sleeve.

The insulating portion of the stress control sleeve may be formed of a rubber.

The insulating portion of the stress control sleeve may be a material with high electrical permittivity.

An embodiment relates to a cable termination assembly comprising apparatus as described in the above clauses and the cable, wherein the stress control sleeve is located radially outwardly of the insulation portion of the cable and partially over the screen layer of the cable, and the conductive portion is in contact with an end portion of the screen layer of the cable.

Another aspect relates to a cable termination apparatus for an underwater cable, the apparatus comprising a cable crimp for electrically connecting the underwater cable to a pin, a conductive crimp screen and an insulating portion which is located radially outwardly of the conductive crimp screen, wherein the insulating portion has been moulded on the conductive crimp screen prior to assembly of the termination.

In an embodiment of such cable termination apparatus, the insulating portion may surround at least a radially outwardly facing surface of the conductive crimp screen.

The apparatus may comprise a conductive layer on a radially outer surface of the insulating portion.

The conductive layer may have been applied by spraying the layer onto the insulating portion.

The apparatus may comprise the pin.

The pin may comprise an insulating bushing extending axially over and radially outwardly of a conductive core of the pin.

The pin may comprise a conductive coating on the radial outer surface of the bushing.

The apparatus may comprise an outer conductive molding which is arranged to extend axially over and radially outwardly of the conductive layer on the insulating portion and the conductive coating on the bushing to electrically connect the conductive layer and the conductive coating.

The outer conductive molding may have been moulded on to the conductive layer on the insulating portion prior to assembly of the termination.

An embodiment provides a cable termination assembly comprising apparatus as described in the above clauses for the other aspect, and further comprising the underwater cable and the pin, wherein the insulating portion has been molded on the conductive crimp screen prior to assembly of the termination.

A further embodiment provides a method of manufacturing a cable termination apparatus for an underwater cable, the method comprises providing a cable crimp for electrically connecting the underwater cable to a pin; molding a conductive crimp screen; molding an insulating portion on the conductive crimp screen to form an overmolding; and locating the overmolding on the cable crimp.

In an embodiment, the method comprises providing a conductive layer on a radially outer surface of the insulating portion of the overmolding.

The step of providing a conductive layer may comprise spraying the conductive layer on to the radially outer surface of the insulating portion of the overmolding.

The method may comprise molding an outer conductive molding on the conductive layer on the insulating portion of the overmolding.

Note that features of aspects and embodiments of the invention can be combined with each other unless noted to the contrary.

What is claimed is:

1. A cable termination apparatus for an underwater cable, comprising:
   a pin;
   a cable crimp that directly contacts and electrically connects the underwater cable to the pin;
   a conductive crimp screen; and
   an insulating portion, located radially outwardly of the conductive crimp screen, the insulating portion being in direct contact with an outer surface of the conductive crimp screen.

2. The cable termination apparatus of claim 1, wherein the insulating portion surrounds at least a radially outwardly facing surface of the conductive crimp screen.

3. The cable termination apparatus of claim 1, further comprising a conductive portion on a radially outer surface of the insulating portion.

4. The cable termination apparatus of claim 1, wherein the pin includes an insulating bushing extending axially over and radially outwardly of a conductive core of the pin.

5. The cable termination apparatus claim 1, wherein the pin includes a conductive layer on the radial outer surface of the insulating bushing.

6. The cable termination apparatus of claim 5, further comprising an outer conductive moulding, arranged to extend axially over and radially outwardly of the conductive layer on the insulating portion and the conductive coating on the insulating bushing.

7. A cable termination assembly, comprising:
   a cable termination apparatus for an underwater cable, the cable termination apparatus including
      a cable crimp configured to directly contact and to electrically connect the underwater cable to a pin,
      a conductive crimp screen, and
      an insulating portion, located radially outwardly of the conductive crimp screen, the insulating portion being in direct contact with an outer surface of the conductive crimp screen;
   and
   the pin.

8. A method of manufacturing a cable termination apparatus for an underwater cable, the cable termination apparatus including a cable crimp to directly contact and to electrically connect the underwater cable to a pin; a conductive crimp screen; and an insulating portion, located radially outwardly of the conductive crimp screen, wherein the insulating portion has been moulded directly onto a surface of the conductive crimp screen prior to assembly of the termination, the method comprising:
   providing a cable crimp for electrically connecting the underwater cable to a pin;
   moulding a conductive crimp screen;
   moulding an insulating portion directly onto a surface of the conductive crimp screen to form an overmoulding; and
   locating the overmoulding on the cable crimp.

9. The method of claim 8, further comprising:
   providing a conductive layer on a radially outer surface of the insulating portion of the overmoulding.

10. The method of claim 9, wherein the conductive layer is applied by spraying.

11. The method of claim 10, wherein the spraying is performed prior to assembly of the termination.

12. The method of claim 9, wherein the providing of the conductive layer comprises spraying the conductive layer on to the radially outer surface of the insulating portion of the overmoulding.

13. The method of claim 8, further comprising moulding an outer conductive moulding on the conductive layer on the insulating portion of the overmoulding.

14. The method of claim 13, wherein the outer conductive moulding is moulded on to the conductive layer on the insulating portion prior to assembly of the termination.

15. The cable termination apparatus of claim 1, wherein the cable crimp is insertable into a recess in the pin.

16. The cable termination assembly of claim 7, wherein the cable crimp is insertable into a recess in the pin.

* * * * *